June 8, 1937.  A. GAMBINO  2,083,368
FRUIT PEELER
Filed March 9, 1936
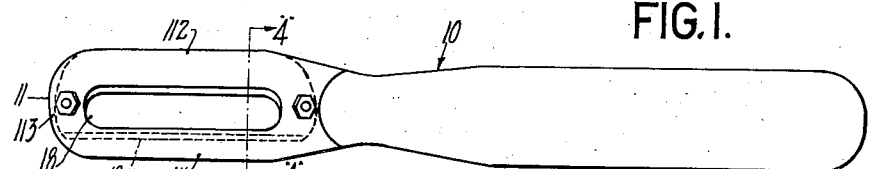
FIG. 1.
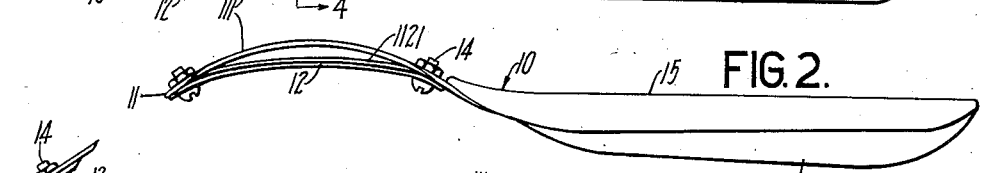
FIG. 2.
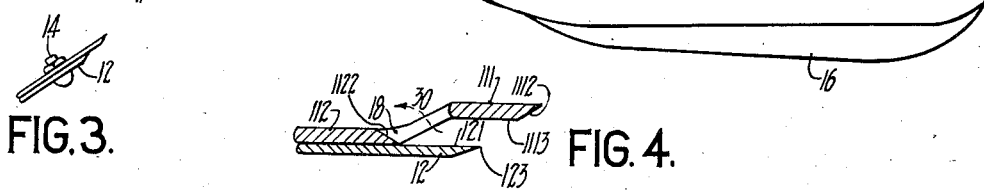
FIG. 3.  FIG. 4.
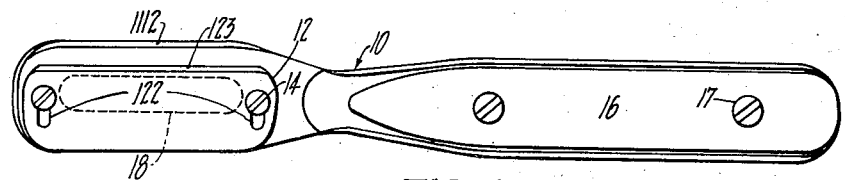
FIG. 5.
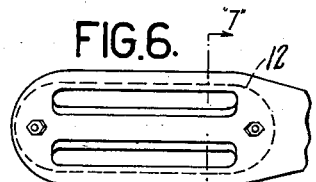
FIG. 6.
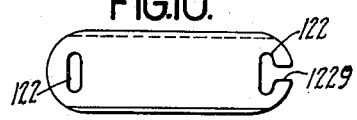
FIG. 10.
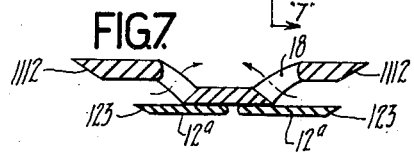
FIG. 7.
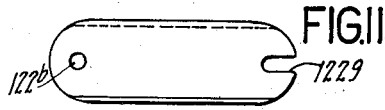
FIG. 11.
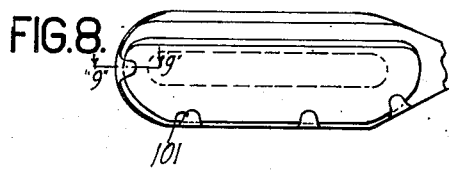
FIG. 8.
FIG. 9.
FIG. 12.
INVENTOR.
Amedeo Gambino
BY M. P. Parish
ATTORNEYS.

Patented June 8, 1937

2,083,368

UNITED STATES PATENT OFFICE 2,083,368

FRUIT PEELER

Amedeo Gambino, New York, N. Y.

Application March 9, 1936, Serial No. 67,993

2 Claims. (Cl. 146—206)

My invention relates to improvements in cutting devices for removing the rind from the outer layers of fruits. One object of my invention is to provide an improved means for obtaining and removing the very outermost layers and the essential oils thereof, of said fruits. It is known that the outermost layers of certain fruits, such as oranges and lemons, contain certain essential oils which are desirable for use as flavoring and for other purposes. However, with the means previously available, it has been impossible to conveniently remove the rind from the outermost layers of fruits without removing, attached thereto, some portion of the inner layers or pulp. This has been undesirable because of the presence of bitter and otherwise unpleasant flavors in these fruit-skin pulp or inner layers. My device adjustably permits removal of such uniform depth of layers as contain the desired elements.

Another object is to provide a means for removing an increased area of said outer layer, in strip form, in one passage of the peeler over the surface of the said fruit. The means previously available were not efficient of operation, and if a fairly thin and long piece of peel were desired, only a small area of the curved surface of the fruit could be removed with one stroke.

Still another object is to provide a means for removing the outermost layer of the fruit without removing any of the body or pulp of said fruit nor otherwise injuring the completeness of said body or pulp. In removing the skin of fruits by means of previous devices it is generally found that some small cuts are made into the body or pulp, causing loss of juices and otherwise injuring the fruit.

A further object is to provide a means for removing an adjustably predetermined thickness of said outer layer of fruit. With devices previously available, no definite predetermined thickness of material could be removed; the thickness removed depending mainly on the skill of the operator in manually varying the pressure or force needed, and in most cases, being uncontrollably irregular in depth.

Another object is to provide a cutting device for removing the surface of fruits in which device the cutting edge or blade may be removed for thorough cleaning, sharpening, or replacement. In devices previously available, the cutting edge has been irremovably attached to the entire device, making cleaning or sharpening difficult, and replacement impossible without discarding the entire device.

These and other objects will be apparent from the following description, accompanying drawing and claims of the improved preferred construction and novel arrangement of parts, it being, however, understood, that no limitations are necessarily made to the precise structural details therein. In the drawing, Figure 1 is a top plan view of the device.

Figure 2 is a front elevation of my invention.

Figure 3 is an end elevation of the left end of my device.

Figure 4 is a sectional view taken on line 4—4 in Fig. 1.

Figure 5 is a bottom plan view of my device.

Figure 6 is a fragmentary top plan view of an embodiment of my device.

Figure 7 is a sectional view taken on line 7—7 in Fig. 6.

Figure 8 is a fragmentary bottom view showing a blade fastening means.

Figure 9 is a sectional view taken on line 9—9 in Fig. 8.

Figures 10 and 11 are top plan views of other forms of blades.

Figure 12 is a sectional view of another embodiment of my device.

My device consists of a frame (10); having an arcuate extension (11), rigidly attached thereto either removably or as an integral part of said frame; a cutting device or blade (12); and means (14) for removably and adjustably retaining the said blade in a rigid arcuate form against the arcuate extension.

The handle (15) as illustrated, may be constructed so as to provide a convenient means for holding the device when in operation, and may have a backing (16) attached thereto by means of screws (17) or the like. The handle may be constructed in any other desirable or convenient form, shape or manner.

The arcuate extension (11) has integral therewith a front strip (111), a rear strip (112), the said front and rear strips being rigidly attached to each other by a bridge (113) at the ends thereof furthest from the handle. A slot (18), sufficiently wide for the material removed from the fruit to pass therethrough without any interference, is provided between the front and rear strips. The front strip is curved longitudinally so that it may adaptably engage a satisfactorily large area on the curved surface of the fruit. The leading edge (1112) of the front strip is bevelled on the concave side at an angle adapted to engage the surface of the fruit. The rear strip is curved so that its ends engage the bridge (113) and the handle (15) tangent to the same planes to which the respective ends of the front strip are tangent. The curvature of the strips differs sufficiently so that the front strip is relatively higher than the rear strip, sufficiently so for the convenient passage of the removed material between the under surface (1113) of the front strip and the upper surface (121) of the blade. The leading edge (1122) of the rear strip is bevelled on the convex side at such convenient angle that it may direct the removed material upward through the slot (18).

The blade (12) is of such size and general shape that no sharp edges or corners may protrude beyond the front or rear strip, the bridge, or the handle, in such manner as to endanger the operator. The slots (122) permit the blade to be held adjustably and rigidly against the concave surface (1121) of the rear arcuate strip by the screws. The blade may be moved backward or forward, and thence held in the desired position by tightening the said screws. The purpose of this adjustment of the blade is to adjustably locate the cutting edge so that upon the angular engagement of the surface of the fruit with the bevelled leading edge (1112) of the front strip, the cutting edge (123) will be at the desired depth under the surface of the fruit to remove the desired thickness of skin. When in this position, and the leading edge and the cutting edge are simultaneously moved forward, a piece of rind of the desired thickness will be removed and passed upward through the slot between front and rear strips in the direction of the arrow (30).

The device may be disassembled into simple parts easily adapted to thorough cleaning, by removing all removable means of attachment, such as the screws. The blade may also be permanently affixed in a desired non-adjustable position by means of rivets or depressed tongues formed integral of the extension.

The embodiment illustrated in Figure 6 shows the device constructed so that it may be operated with a motion either away from the body of the operator, or toward the said operator, in either the right hand or the left hand. Figure 7 indicates that when the device is moved toward the right or left, the bevelled leading edge (1112) will engage the surface of the fruit at such an angle that the cutting edge (123) may remove the desired thickness of peel, which peel will then be directed through the slot (18) in the direction of the arrow (30). It is seen from Figure 6 that both cutting edges may be provided for in one blade (12) which may be adjustable as the blade in the construction first described in Figures 1, 2, 3, 4, and 5; or the cutting edges may be provided for by more than one blade (12a) any or all of which may be individually adjustable.

The device may be so constructed with adjustable blade or blades that in the same implement, means are available to remove first the outermost layer of fruit such as of the citrus varieties, so that such outermost layer may be utilized as desired; and then to remove the inner layer of the rind, which inner layer is generally of a different thickness from the outermost layer, thus leaving available the pulp of the fruit with the natural covering thereof removed. The device may thus be adapted to accommodate different species having rinds of different thicknesses, or to accommodate one or more layers of the same species, such layers having different thicknesses, without requiring subsequent adjustment for removing different thickness of layers.

In Figures 8 and 9, the device is shown utilizing lips, (101) formed integral of the frame, to removably hold the blade (12). In this embodiment, a simpler construction is available, so that additional parts, such as the screws (14) in Figures 2 and 3 may be eliminated.

Figures 10 and 11 illustrate a blade having two cutting edges (123) and slots (122) enabling this type of blade to be used in the embodiments of the invention as illustrated in Figures 1 to 5, and also in the embodiment, to be hereinafter described, shown in Figure 12. This blade, with slots omitted, may be used in the construction shown in Figure 8. The slot (1229) may be provided to enable the blade to be inserted by sliding the right hand side under the head of one of the screws (14), and then inserting the other screw through the left hand slot and into engagement with the extension.

A purpose of this type of blade is to permit insertion of the blade into the frame, to be rigidly and adjustably held therein, without the necessity of removing both screws before the said insertion. Similarly, with the construction of the blade as shown in Figure 11, the right hand screw may be replaced by a headed post (141), the said post being rigidly attached to the frame (113). In this embodiment, the blade may be slid under said head by means of the horizontal slot (1229) and the screw (14) inserted through the hole (122b) or the like.

I claim:

1. In a fruit peeling device, a member having a longitudinally curved arcuate extension, having a longitudinal slot therein dividing the extension into front and rear arcuate strips, the curvature of the front strip being greater than the curvature of the back strip and intersecting each other adjacent the ends of the slot, the front strip also having an upwardly bevelled outer edge adapted to engage the outer surface of the fruit, and a springable cutting blade mounted flush with the rear arcuate strip and conforming to the curvature thereof, said blade being secured at its ends to the extension adjacent the ends of the slot and mounted with its cutting edge parallel to the rear edge of the slot and adjustable relative thereto.

2. In a fruit peeling device, a member having a longitudinally curved arcuate extension having longitudinal slots therein dividing the extension into at least one front and a back arcuate strips, the curvature of said front strip being greater than the curvature of the back strip and intersecting each other adjacent the ends of the slot therebetween, the front strip also having an upwardly bevelled outer edge adapted to engage the outer surface of the fruit, and a springable cutting blade mounted flush with the back arcuate strip and conforming to the curvature thereof, said blade being secured at its ends to the extension adjacent the ends of said slot and mounted with its cutting edge parallel to the edges of said back strip and adjustable relative thereto.

AMEDEO GAMBINO.